United States Patent Office 3,196,097
Patented July 20, 1965

3,196,097
PHOTOCHEMICAL SYNTHESIS OF SECONDARY DIARYLAMINES
Gordon M. Ide, Morristown, N.J., and Robert E. Jones, Muskegon, Mich., assignors to Merck & Co., Inc., Rahway, N.J., a corporation of New Jersey
No Drawing. Filed June 8, 1961, Ser. No. 115,604
4 Claims. (Cl. 204—158)

This invention relates to a method for converting tertiary amines to secondary amines and, more particularly, to a novel process for the synthesis of diarylamines from alkyldiarylamines by the action of light radiation.

In synthetic organic chemistry, it is often quite useful to provide a method of synthesis of a secondary amine, from a corresponding tertiary amine by a process wherein other substrates in the molecule remain unaffected. For example, one method for accomplishing this result which is available to the art is the well-known Von Braun degradation reaction wherein the cyanogen bromide reagent is used. However, this reaction suffers the disadvantage of requiring the use of a relatively dangerous and expensive reagent and one which is likely to have an adverse effect upon other substituents in the molecule. Accordingly, it has been the object of considerable research to provide other methods for the synthesis of secondary diarylamines which may be applied to a wide variety of chemical compounds.

An object of the present invention is to provide a method of synthesis of diarylamines.

Another object of the instant invention is to provide a method of synthesis of secondary diphenylamines from tertiary alkyl diphenylamines.

Still another object of this invention is to provide a novel method of synthesizing secondary amines in the phenazasiline class of compounds.

These and other objects will appear more fully in the disclosure which follows.

In accordance with the present invention, a tertiary alkyldiarylamine is converted to the corresponding secondary diarylamine by the action of light radiation, preferably ultraviolet radiation. The ultraviolet radiation is conveniently supplied by ordinary sunlight or from an ultraviolet lamp. In the preferred embodiment of the process, their radiation is carried out on a solution of the tertiary amine in a solvent such as a hydrocarbon or an alcohol.

The present invention may be illustrated clearly by reference to the following flow sheet:

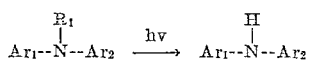

wherein $R_1$ is typically an alkyl or alkenyl radical such as methyl, ethyl, etc., and $Ar_1$ and $Ar_2$ are typically aryl radicals or equivalents thereof such as phenyl. The letters $h\nu$ denote light radiation.

The method of the present invention may be illustrated for example, by specific reference to the conversion of the model compound N-alkyldiphenylamine to diphenylamine by irradiation of N-alkyldiphenylamine with ultraviolet light.

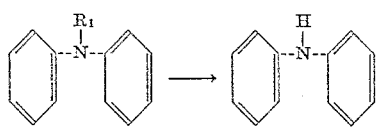

In a similar manner, other substituents may be present on the phenyl ring, such as halogen and alkoxy, which remain unaffected during the process. Furthermore, the insertion of heteroatoms, such as silicon, between the phenyl rings, as in the case of the heterocyclic 5-alkyl-10,10-diphenylphenazasiline also does not hinder the removal of the N-alkyl group. Specifically 5-ethyl-10,10-diphenylphenazasiline is converted to the corresponding 10,10'-diphenylphenazasiline by irradiation with ultraviolet light as illustrated in the following example where $R_1$ is ethyl.

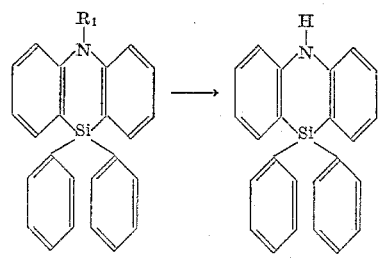

The phenazasiline class of compounds are known in the art to find wide utility as antioxidants for high temperature lubricants.

Still another illustration of the general nature of the reaction of the present invention is the case of the spirobiphenylphenazasiline class of compounds. Accordingly, the tertiary amine, 5,5' - dialkyl - 10,10' - spirobiphenylphenazasline, having the formula:

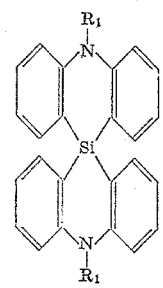

may be readily converted to the monodealkylated product, 5-alkyl-10,10'-spirobiphenylphenazasiline, having the formula:

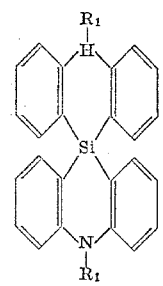

and upon further irradiation of the monodealkylated compound to the completely dealkylated compound, 10,10'-spirobiphenylphenazasiline:

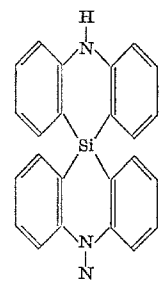

The invention now will be illustrated in detail with respect to the specific examples which follow.

Example 1.—Diphenylamine

One gram of N-ethyldiphenylamine is purified by chromatography over acid-washed alumina dissolved in 10 g. of hexane and sealed under oxygen gas in a Pyrex ampule. After illumination under a Hanovia L–679A–36 ultraviolet lamp for ten hours the ampule is opened and washed onto a chromatographic column of 20 g. of acid-washed alumina. Eighty percent of the original N-ethyldiphenylamine is then recovered in three hexane chromatographic fractions of 75 ml. each. Thereafter, a 500 cc. benzene eluate is added to the column and 190 milligrams (19%) of crystalline diphenylamine is obtained.

Example 2.—10,10-diphenylphenazasiline

Four grams of 5-ethyl-10,10-diphenylphenazasiline is dissolved in 500 cc. of hexane and the solution is irradiated as before for ten hours. The resultant solution is then filtered and the filtrate is chromatographed to produce the following products:

| Fraction | Solvent | Volume, cc. | Amount of Product, g. | Characteristics of Product |
|---|---|---|---|---|
| 1 | Hexane | 500 | 0.059 | Oil. |
| 2 | Hexane | 500 | 1.10 | Cryst. M.P. 116–122° C. (5-10-10). |
| 3 | 40% Benzene / 60% Hexane | 500 | 1.51 | Cryst. M.P. 190–196° C. |
| 4 | Benzene | 200 | 0.40 | Cryst. M.P. 200–203° C. |
| 5 | Benzene | 500 | 0.090 | Red oil. |
| 6 | Ether | 500 | 0.240 | Red oil. |
| 7 | Acetone | 500 | 0.00 | |

Fractions 3 and 4 are identified as 10,10-diphenylphenazasiline.

U.V. SPECTRUM

| $\lambda$ max. | E, percent |
|---|---|
| 3,290 | 205 |
| 3,280 | 187 |
| 3,080 | 258 |
| 2,810 | 503 |
| 2,230 | 1,192 |

Example 3.—5-ethyl-10,10'-spirobiphenylphenazasiline

Four grams of 5,5'-diethyl-10,10'-spirobiphenylphenazasiline is dissolved in 200 ml. of benzene and 500 ml. of hexane. The solution is allowed to stand in the sunlight for 28 days. The solution turns to a light pink in a few hours and finally to a deep red with some precipitation after about four days. At the conclusion of the irradiation, the solution is chromatographed over 80 g. of alumina as in Example 2. The cuts which are eluted with benzene contain 1.0 g. of 5-ethyl-10,10'-spirobiphenylphenazasiline, M.P. 191–198° C., which, when recrystallized from ethyl acetate, affords 0.5 g. of tan crystals, M.P. 210–216° C.

*Analysis.*—Calc'd for $C_{26}H_{22}N_2Si$: C, 80.05; H, 5.65; N, 7.20; Si, 7.20. Found: C, 80.20; H, 5.65; N, 7.29; Si, 7.69.

Infrared spectrum: Shows —NH, in accord with formula.

U.V. SPECTRUM

| $\lambda$ max. | E, percent |
|---|---|
| 3,425 | 414 |
| 3,295 | 296 |
| 3,080 | 527 |
| 2,800 | 630 |
| 2,500 | 288 |
| 2,220 | 778 |

Example 4.—10,10'-spirobiphenylphenazasiline

The product of Example 3 is dissolved in 100 cc. of warm isopropyl alcohol and the solution is allowed to stand in bright sunlight for about one week. The resultant solution is chromatographed as before to produce 10,10'-spirobiphenylphenazasiline.

We claim:

1. A method for preparing a secondary diarylamine from a tertiary alkyldiarylamine which comprises exposing a tertiary alkyldiarylamine to ultraviolet light radiation in the presence of oxygen and recovering the secondary diarylamine thereby produced.

2. A method for preparing a secondary diarylamine from a tertiary alkyldiarylamine which comprises exposing a tertiary alkyldiarylamine in a solvent to ultraviolet light radiation in the presence of oxygen and recovering the secondary diarylamine thereby produced.

3. A method in accordance with claim 1 wherein said tertiary alkyldiarylamine is N-ethyldiphenylamine.

4. A method in accordance with claim 1 wherein said tertiary alkyldiarylamine is 5-ethyldiphenylphenazasiline.

References Cited by the Examiner

UNITED STATES PATENTS 2,726,252   12/55   Balon et al. _____ 204—158
3,046,209   7/62    Sprague _____ 204—158

JOHN H. MACK, *Primary Examiner.*

JOHN R. SPECK, WINSTON A. DOUGLAS,
*Examiners.*